May 11, 1954     L. G. CROOKS     2,678,345
STORAGE BATTERY NONOVERFILL DEVICE
Filed Jan. 10, 1950
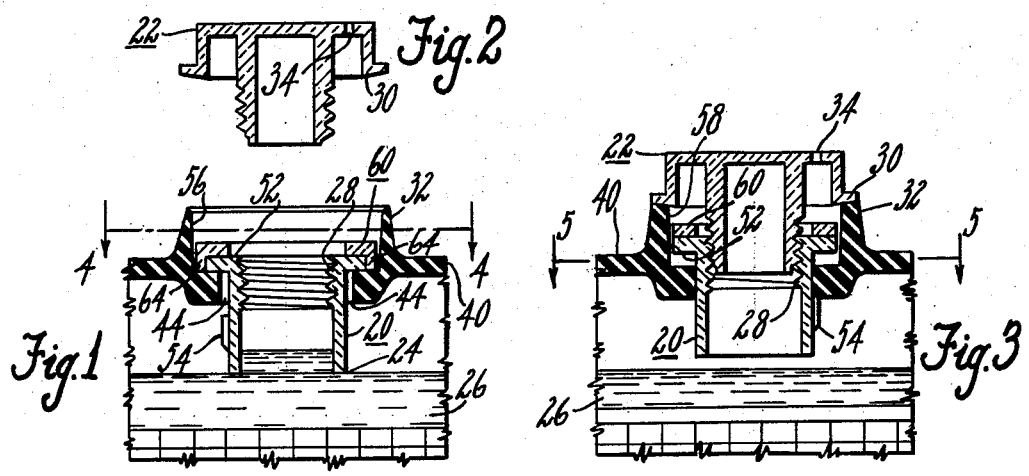
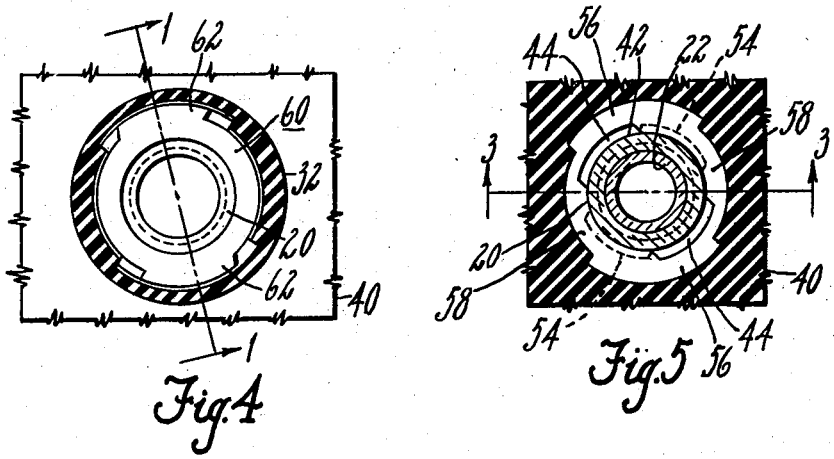
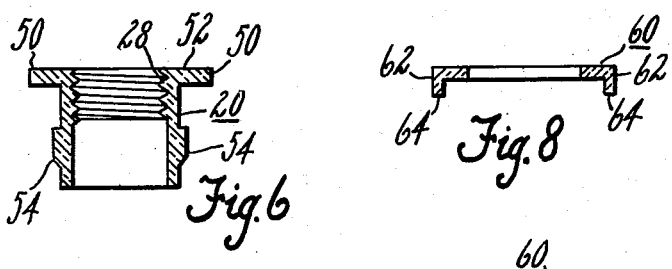
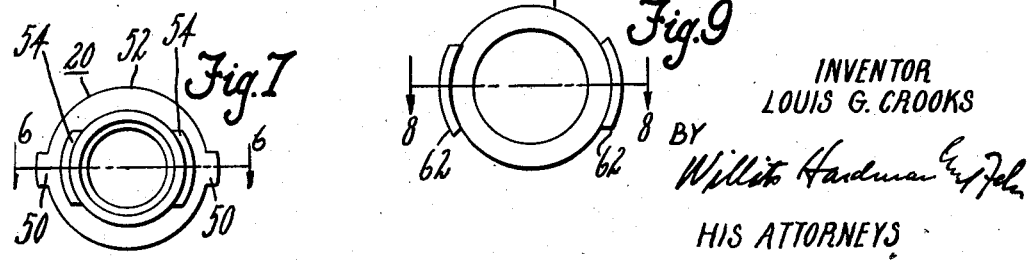
INVENTOR
LOUIS G. CROOKS
BY
HIS ATTORNEYS Patented May 11, 1954

2,678,345

UNITED STATES PATENT OFFICE 2,678,345

STORAGE BATTERY NONOVERFILL DEVICE

Louis G. Crooks, Muncie, Ind., assignor to General Motors Corporation, Detroit, Mich., a corporation of Delaware Application January 10, 1950, Serial No. 137,858

3 Claims. (Cl. 136—178)

This invention relates to cell cover assemblies and is particularly directed to non-overfill devices for use with storage battery cell covers or other containers for electrolyte.

The principal object of the invention is to provide a non-overfill device which cooperates with a battery cell vent cap wherein the device is incorporated in the cell cover and is operated to venting position by insertion of the vent cap and which non-overfill device drops downwardly upon removal of the cap to form a fluid seal with battery acid for preventing overfilling of the cell when water or acid are being added thereto.

In carrying out the above object it is a further object of the invention to utilize a valve mechanism which seats by gravity to seal the battery cell and which is unseated by the vent cap for permitting breathing within the cell.

A still further object of the invention is to provide locking means cooperating with said valving mechanism for preventing accidental removal or loss thereof which locking device is easily assembled to the valving mechanism from the outside of the battery.

Further objects and advantages of the present invention will be apparent from the following description, reference being had to the accompanying drawings wherein a preferred embodiment of the present invention is clearly shown.

In the drawings:

Fig. 1 is a fragmentary, sectional view of a battery cell cover taken on line 1—1 of Fig. 4, showing a portion of the electrolyte.

Fig. 2 is a sectional view of a vent cap used in connection with the cell cover and non-overfill device shown in Fig. 1 and positioned directly above the over-fill device ready for insertion therein.

Fig. 3 is a fragmentary, sectional view of a cell cover and a non-overfill device with the vent cap in place wherein the battery is permitted to breathe through the vent cap, this view being taken on line 3—3 of Fig. 5.

Fig. 4 is a fragmentary view in section taken on the line 4—4 of Fig. 1.

Fig. 5 is a fragmentary, sectional view taken on the line 5—5 of Fig. 3.

Fig. 6 is a sectional view of the valving mechanism of the non-overfill device taken on line 6—6 of Fig. 7.

Fig. 7 is a bottom view of the valving mechanism of the non-overfill device.

Fig. 8 is a sectional view taken on the line 8—8 of Fig. 9, and is a section through the locking ring for the valving mechanism.

Fig. 9 is a bottom view of the locking ring used in connection with the valving mechanism of the non-overfill device.

In practice, it is preferable, in connection with storage batteries, to provide said batteries with means for preventing overfilling of the cells with either water or electrolyte. It is desirable to have electrolyte within the cell of the battery sufficient to cover the plates therein but in insufficient quantities to completely fill the cell, thereby eliminating any breathing space for expansion of the electrolyte due to changes in temperature. If the cell is overfilled in this manner and the electrolyte expands, it is expelled through the vent cap and spills over the top of the battery thereby corroding battery hangers or other devices used to position the battery. Therefore, it is highly desirable to provide non-overfill devices in connection with cell covers which prevent overfilling the cells with electrolyte, particularly when water is being added to the battery.

In this connection, it is a simple matter to prevent the overfilling of a battery by providing a sleeve or non-overfill device 20 as shown in Fig. 1, which drops downwardly when the cap 22 is removed from the battery through the action of gravity. If the electrolyte level is low, water may be poured in through the sleeve 20 until it is visible within the sleeve, it being impossible to overfill the battery due to the liquid seal which is formed at the end of the sleeve 20 as at 24 with the electrolyte 26. This leaves an appreciable volume at the upper portion of the battery cell free of electrolyte. When the cap 22 is screwed into threads 28 of sleeve 20, this sleeve is pulled upwardly due to the rim 30 of the cap 22 resting on top of the cell cover 32 whereby the sleeve 20 is removed from contact with the electrolyte, permitting breathing through the sleeve and aperture 34 in the cap.

This general type of non-overfill device is not new, the same principle being shown in the device as described and claimed in Hill et al., Patent No. 2,298,789 assigned to the assignee of the invention here. The present invention is directed to specific details of improvement in the non-overfill device with particular reference being had to the method of assembly of said device, it being very desirable to lock the non-overfill device in position in the cell cover so that it can not be removed accidentally or lost. In this respect, the cell cover 40 is provided with an aperture 42 therethrough which includes a pair of opposed slots or enlarged diameter portions 44 therein. The sleeve 20 includes a pair of ears 50 which are carried by an upper flange portion 52. Beneath the flange 52 a second pair of ears or camming surfaces 54 are provided on opposite sides of the sleeve 20. The cams 54 are of such size as to pass through the slots 44 in the aperture in the cell cover 40 whereby when the sleeve 20 is turned, the cams 54 lock beneath the cell cover and prevent removal thereof. At the upper side of the cell cover, as shown in Fig. 1, is an enlarged diameter cavity 56 which includes opposed reduced diameter portions 58 at either side thereof as shown in Fig. 3. Thus when the sleeve 20 is in place and has been turned, the ears 50 fill a major portion of the cavity and the sleeve 20 is held from removal by the action of the cams 54 against the lower surface of the cell cover which has a reduced diameter. In order to maintain the sleeve 20 in this position a locking washer 60 is provided which includes a central aperture of substantially the same diameter as the inner diameter of the sleeve 20 and which includes two outwardly extending ears 62 which have downwardly extending portions 64 therein wherein the diameter between the two portions 64 is the same or slightly less than the diameter of the flange 52. Thus when the ring 60 is dropped over the flange 52 and pressed therein as shown in Fig. 1, the ring 60 grips the flange 52 through the action of the downwardly extending portions 64 and thereby prevents removal thereof. Simultaneously, the enlarged diameter lug portion 62 substantially fill the cavity 56 at the external surface thereof and abuts the ears 50 on the sleeve, thereby preventing any substantial turning of the sleeve within the cell cover which automatically prevents the cams 54 from becoming aligned with the slots 44 thereby locking the entire device in place within the cell cover.

In practice, the non-overfill device may be made of any material which is acid-resistant and which has a specific gravity of two or above so that the non-overfill device will not float on the battery acid but will drop therein by gravity when the cap is removed. Thermosetting resins such as phenol formaldehyde resins, hard rubber or lead all may be used for this purpose. I prefer a molded part, due to cost and ease of assembly. This molded part is made for a press fit with the locking ring 60 which is the only critical factor of measurement in the entire device. In some cases, it may be desirable to place a small quantity of cement under the surface of the locking device 60 prior to its assembly to the non-overfill valving mechanism or sleeve 20. In this case, removal is permanently prevented and if for any reason the non-overfill device must be removed, it is necessary to replace the entire device. However, in all instances, I have found that the friction grip between the locking ring 60 and the sleeve 20 is sufficient to maintain the parts in assembly at all times against accidental removal or displacement.

It will be apparent that the invention resides in the specific locking assembly for the non-overfill device wherein a simple ring which is carried entirely by the valving mechanism, prevents accidental removal of the non-overfill device without the necessity of coring or machining the cell cover assembly or operating upon the valving mechanism after assembly to the cell cover whereby the cost of the assembly of the non-overfill device is markedly reduced and facilitated.

While the embodiment of the present invention as herein disclosed, constitutes a preferred form, it is to be understood that other forms might be adopted.

What is claimed is as follows:

1. A non-overfill device for a liquid container comprising in combination, a cover for the container having a filler opening therethrough, an inwardly extending flange in said filler opening having a reduced diameter portion and including two opposed radial slots therethrough of larger diameter than the remainder of the opening, a flanged valving mechanism having a skirt adapted to extend through said cover which includes two opposed cams, thereon said cams being spaced a greater distance for the flange than the thickness of the filler opening flange and so dimensioned as to pass through the enlarged slot portions in said filler opening flange and of too great a diameter to pass through the remainder of the opening whereby the valving mechanism may be inserted through the slot portions and turned for interlocking the mechanism to the cover and for simultaneously limiting axial movement thereof with respect to the cover, two outwardly extending lugs on the flange portion of the valving mechanism adapted to fit within grooves formed at the opposite sides of said container wall for loosely receiving said lugs and limiting rotational movement of the lugs and the appended valving mechanism, and a locking ring retained in position on said valve flange and carried entirely thereby and cooperating with said lugs for substantially filling the grooves whereby rotational movement of the valving mechanism within the grooves is prevented for maintaining the interlock between the valving mechanism and the cover.

2. A non-overfill device for a liquid container comprising in combination; a cover for the container having a filler opening therethrough including, an inwardly extending flange portion within the filler opening restricting the diameter thereof, a pair of opposed slots in the flanged portions providing a larger diameter portion than the remainder of the restricted opening, and a pair of opposed notches in the filler opening wall providing a greater diameter therefor, a vent cap having an extended threaded portion and a perimeter portion adapted to engage a portion of the cover, a valving sleeve adapted to have a portion thereof pass through a restricted portion of said filler opening, said valving sleeve including, a threaded portion on an internal surface thereof adapted to cooperate with threads on the vent cap, a pair of opposed lugs on the outer surface of said sleeve, said lugs adapted to pass through the slots of a flanged portion of said filler opening and be engaged by the flanged portion of the filler when said lugs are misaligned relative to said notches, a flange on one end of said sleeve, said flange having a spaced axial relation to said lugs and having a diameter greater than a restricted diameter portion and less than the diameter of said filler opening, thereby limiting axial movement of the sleeve with respect to the cover when said lugs are misaligned relative to the notches in their filler flange, and a pair of oppositely disposed lugs on said flange, said lugs adapted to engage a portion of said notches in said filter opening so as to limit rotative movement of the sleeve relative to the cover, and a locking ring for said sleeve, said ring including, an annulus adapted for inserting into said filler opening having a central aperture at least as great as the internal diameter of said sleeve and a pair of oppositely disposed lugs on the outer perimeter of said annulus, said lugs having extending portions thereon filling the remainder of the notches in the filler opening thereby preventing the sleeve from rotating in said notches, while frictionally engaging the flange of said sleeve and preventing axial removal of said locking ring from said sleeve during periods when the vent cap is unthreaded from the sleeve thereby permitting the sleeve normally in one position and providing a gas egress from the interior of the container to assume another position wherein the flange on the sleeve while cooperating with the flange on the filler opening closes the gas egress thus rendering the overfill device operative.

3. A non-overfill device for use in conjunction with a cover having a filler opening and a filler cap comprising in combination a sleeve adapted to fit through said opening and including a skirt and flange thereon, said sleeve being axially movable within said opening and rotationally immovable therein for effecting a locking action with said cover, means for limiting the axial movement of said sleeve in one rotational position thereof and a removable locking ring frictionally retained in position on said valve flange and carried entirely thereby and cooperating with said flange and said filler opening for locking said sleeve in said one rotational position, and a cap cooperating with said sleeve for axially moving said sleeve to a predetermined position.

References Cited in the file of this patent

UNITED STATES PATENTS

| Number | Name | Date |
|---|---|---|
| 2,242,671 | Godber | May 20, 1941 |
| 2,242,672 | Godber | May 20, 1941 |
| 2,287,132 | Redmon | June 23, 1942 |
| 2,297,326 | Rieser | Sept. 29, 1942 |
| 2,298,789 | Hill | Oct. 13, 1942 |
| 2,338,389 | Woodbridge | Jan. 4, 1944 |
| 2,385,624 | Godber | Sept. 25, 1945 |
| 2,407,826 | Godber | Sept. 17, 1946 |